Dec. 31, 1929.                G. BRANDAU                    1,742,156
                          MUDGUARD FOR VEHICLES
                            Filed Dec. 3, 1928
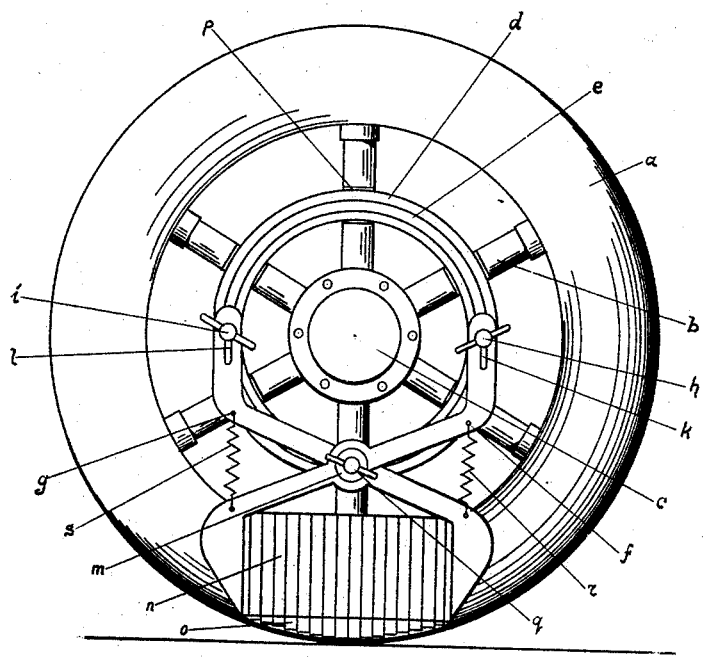
INVENTOR
G. BRANDAU

UNITED STATES PATENT OFFICE

GEORG BRANDAU, OF BREMEN, GERMANY

MUDGUARD FOR VEHICLES

Application filed December 3, 1928, Serial No. 323,451, and in Germany January 3, 1928.

The object of the present invention concerns a mudguard similar to those already in use, these being of various designs. The present invention is designed in such a way that the mudguard can be fitted to the wheel of the vehicle in an easily interchangeable manner, that it springs in accordance with the shocks to which the vehicle is subject, and that the mud-catching surface is widened when the vehicle passes rough and uneven parts of the roadway where the mud naturally accumulates more than elsewhere. The mudguard here described consists of a scissor-shaped spring connected at one end with the wheel rim, whilst the opposite ends are connected with one another by means of a folding leather or some piece of folding material. The spring mechanism of the scissors is arranged in such a manner that, in the event of shocks experienced by the vehicle owing to rough parts of the road, its opening is enlarged, so that the folding leather is stretched thereby.

The drawing shows, by way of an example, how the invention can be utilized.

The spokes (b) of an automobile (a) are fitted with a guide rim (d) which, in turn, is fitted with a wheel rim (e). The arms (f) and (g) are adjustably fastened, by means of the binding screws (h) and (i), to the wheel rim (e). The slots (k) and (l) serve to effect the adjustability referred to. The arms (f) and (g) intersect one another, the point of intersection being secured by the screw (m). The two arms are made elastic by means of the springs (r) and (s), and the wide part of the opening between their ends is spanned by the folding leather (n). Loosely-fitted leather flaps (o) are provided at the lower edge of the folding leather.

What I claim to be new is:

1. A mudguard for vehicle wheels, including arms pivotally connected for relative movement, means whereby one end of each of the arms is adjustably connected to the wheel, an extensible and flexible guard arranged intermediate and connected to the remaining ends of the respective arms, and a spring intermediate the guard connected end of each arm and the vehicle connected end of the other arm.

2. The combination with a vehicle wheel, of a guide rim secured to the spokes thereof concentric with the axis of the wheel, pivotally connected cross arms, means whereby one end of each arm is adjustably secured to the guide rim, the remaining ends of the arms being positioned adjacent the periphery of the wheel, and a flexible and extensible guard positioned intermediate the ends of the arms adjacent the periphery of the wheel.

In testimony whereof he affixes his signature.

GEORG BRANDAU.